(12) United States Patent
Kriegel

(10) Patent No.: US 7,131,492 B2
(45) Date of Patent: Nov. 7, 2006

(54) DIVINYL SULFONE CROSSLINKING AGENTS AND METHODS OF USE IN SUBTERRANEAN APPLICATIONS

(75) Inventor: Robert M. Kriegel, Marietta, GA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/969,631

(22) Filed: Oct. 20, 2004

(65) Prior Publication Data

US 2006/0081369 A1  Apr. 20, 2006

(51) Int. Cl.
*E21B 21/00* (2006.01)
*E21B 43/04* (2006.01)
*E21B 43/22* (2006.01)
*E21B 43/26* (2006.01)
*C09K 7/02* (2006.01)

(52) U.S. Cl. .................. 166/278; 166/300; 166/305.1; 166/308.5; 175/65; 507/110; 507/111; 507/112; 507/134; 507/209; 507/211; 507/212; 507/214; 507/257

(58) Field of Classification Search ................ 166/278, 166/300, 305.1, 308.5; 175/65; 507/110, 507/111, 112, 134, 209, 211, 212, 214, 257
See application file for complete search history.

(56) References Cited

U.S. PATENT DOCUMENTS

| | | | |
|---|---|---|---|
| 4,003,393 A | 1/1977 | Jaggard et al. | |
| 4,473,408 A | 9/1984 | Purinton, Jr. | |
| 4,525,581 A * | 6/1985 | Denziger et al. | 528/503 |
| 4,577,015 A | 3/1986 | Jager et al. | |
| 4,622,155 A | 11/1986 | Harris et al. | |
| 4,843,149 A | 6/1989 | Kayane et al. | |
| 5,250,670 A | 10/1993 | Schlafer et al. | |
| 5,271,464 A | 12/1993 | McCabe | |
| 5,373,901 A | 12/1994 | Norman et al. | |
| 5,414,135 A | 5/1995 | Snow et al. | |
| 5,484,455 A | 1/1996 | Kelley | |
| 5,543,332 A | 8/1996 | Lihme et al. | |
| 5,846,915 A | 12/1998 | Smith et al. | |
| 6,030,442 A * | 2/2000 | Kabra et al. | 106/162.8 |
| 6,169,058 B1 * | 1/2001 | Le et al. | 507/222 |
| 6,228,812 B1 * | 5/2001 | Dawson et al. | 507/221 |
| 6,248,699 B1 * | 6/2001 | Subramanian et al. | 507/265 |
| 6,283,215 B1 | 9/2001 | Kohler et al. | |
| 6,444,316 B1 | 9/2002 | Reddy et al. | |
| 6,527,051 B1 | 3/2003 | Reddy et al. | |
| 6,554,071 B1 | 4/2003 | Reddy et al. | |
| 2003/0155122 A1 * | 8/2003 | Chang et al. | 166/270 |
| 2003/0230431 A1 * | 12/2003 | Reddy et al. | 175/64 |

OTHER PUBLICATIONS

Sannino, A.; Madaghiele, M.; Conversano, F.; Mele, G.; Maffezzoli, A.; Netti, P.A.; Ambrosio, L.; Nicolais, L.; *Biomacromolecules 2004*, 5, 92-96.

* cited by examiner

*Primary Examiner*—George Suchfield
(74) *Attorney, Agent, or Firm*—Robert A. Kent; Baker Botts

(57) ABSTRACT

This invention relates to divinyl sulfone crosslinking agents, viscosified treatment fluids, and methods of using these compositions in applications wherein viscosified treatment fluids may be used. In one embodiment, this invention provides a method of treating a portion of a subterranean formation comprising: providing a viscosified treatment fluid that comprises an aqueous base fluid and a crosslinked gelling agent, the crosslinked gelling agent comprising at least one alkyl sulfone bridge, and treating the portion of the subterranean formation.

31 Claims, No Drawings

DIVINYL SULFONE CROSSLINKING AGENTS AND METHODS OF USE IN SUBTERRANEAN APPLICATIONS

BACKGROUND

The present invention relates to methods and compositions for increasing the viscosity of a fluid. More particularly, the present invention relates to divinyl sulfone crosslinking agents, viscosified treatment fluids, and methods of using these compositions in applications wherein viscosified treatment fluids may be used.

Many industrial applications require viscosified fluids or "viscosified treatment fluids." For instance, the upstream energy industry uses viscosified treatment fluids in a variety of production and stimulation operations. For example, such fluids may be used as drilling fluids, fracturing fluids, and/or gravel packing fluids.

Viscosified treatment fluids that are used in subterranean operations generally are aqueous-based fluids that comprise gelling agents. These gelling agents may comprise biopolymers or synthetic polymers. Common gelling agents include, e.g., galactomannan gums, cellulosic polymers, and polysaccharides.

To increase the viscosity viscosified treatment fluid, often the gelling agent is crosslinked with the use of a crosslinking agent. Conventional crosslinking agents usually comprise a metal, transition metal, or metalloid, collectively referred to herein as "metal(s)." Examples include boron, aluminum, antimony, zirconium, magnesium, or titanium. Generally, the metal of a crosslinking agent interacts with at least two gelling agent molecules to form a crosslink between them, thereby forming a crosslinked gelling agent.

Many of the metal based crosslinking agents have drawbacks associated with their use. For instance, boron-containing crosslinking agents generally are limited to viscosified treatment fluids used in environments that have a pH of about 8 and above and a temperature below about 300° F. This pH requirement may preclude using salt water in a viscosified treatment fluid. Similarly, viscosified treatment fluids comprising gelling agents that are crosslinked with boron-containing crosslinking agents may suffer from thermal instability at certain elevated temperatures, like those frequently encountered in some subterranean operations. In addition, boron-containing crosslinking agents often react with additives commonly used with treatment fluids, e.g., glycols (such as ethylene or propylene glycol) or alcohols (such as methanol). To overcome this propensity, boron crosslinking agents typically are added in excess to treatment fluids, which may increase the environmental footprint and the costs associated with the treatment fluid. Similarly, titanium-based crosslinking agents have disadvantages. These include cost, delay in crosslinking, and a limited scope of gelling agents that may be crosslinked. Zirconium-based crosslinking agents also have drawbacks. One of the important drawbacks associated with zirconium-based crosslinking agents is their inability to crosslink xanthan, which is a commonly used gelling agent. Moreover, titanium- and zirconium-based crosslinks form permanent crosslinks that cannot be reversed, which may be undesirable. This quality is important when "breaking" (i.e., reducing the viscosity of) a viscosified treatment fluid comprising a crosslinked gelling agent that has been crosslinked with a titanium- or zirconium-based crosslinking agent because the breaking has to occur by breaking the gelling agent molecules rather than delinking the crosslinks, which can lead to formation fouling. Also, certain formation conditions and cationic species may be problematic for metal-based crosslinking agents.

SUMMARY

The present invention relates to methods and compositions for increasing the viscosity of a fluid. More particularly, the present invention relates to divinyl sulfone crosslinking agents, viscosified treatment fluids, and methods of using these compositions in applications wherein viscosified treatment fluids may be used.

In one embodiment, the present invention provides a method of treating a portion of a subterranean formation comprising: providing a viscosified treatment fluid that comprises an aqueous base fluid and a crosslinked gelling agent, the crosslinked gelling agent comprising at least one alkyl sulfone bridge, and treating the portion of the subterranean formation.

In another embodiment, the present invention provides a method of making a viscosified treatment fluid comprising: adding a divinyl sulfone crosslinking agent to an aqueous base fluid, the aqueous base fluid having a pH of about 7 or above and comprising a hydrated gelling agent to form a base gel; heating the base gel to above room temperature; allowing at least one alkyl sulfone bridge to form between gelling agent molecules in the base gel to form a viscosified treatment fluid comprising a crosslinked gelling agent comprising at least one alkyl sulfone bridge.

In another embodiment, the present invention provides a method comprising: providing a treatment fluid that comprises: an aqueous base fluid; a gelling agent; and a crosslinking agent, the crosslinking agent comprising a component that can be described by this formula:

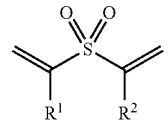

wherein R1 comprises a hydrocarbon group having from about 1 to about 30 carbon atoms, R2 comprises a hydrocarbon group having from about 1 to about 30 carbon atoms, and R1 and R2 do not comprise a hydroxyl group; and using the treatment fluid in connection with a subterranean operation.

In another embodiment, the present invention provides a viscosified treatment fluid comprising an aqueous base fluid and a crosslinked gelling agent, the crosslinked gelling agent comprising at least one alkyl sulfone bridge.

In another embodiment, the present invention provides a viscosified treatment fluid comprising an aqueous base fluid and a crosslinked gelling agent, the crosslinked gelling agent being formed by a crosslinking reaction comprising a gelling agent and a divinyl sulfone crosslinking agent described by this formula:

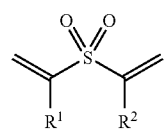

wherein R1 comprises a hydrocarbon group having from about 1 to about 30 carbon atoms, R2 comprises a hydrocarbon group having from about 1 to about 30 carbon atoms, and R1 and R2 do not comprise a hydroxyl group.

In another embodiment, the present invention provides a treatment fluid that comprises: an aqueous base fluid; a gelling agent; and a crosslinking agent, the crosslinking agent comprising a component that can be described by this formula:

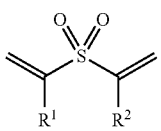

wherein R1 comprises a hydrocarbon group having from about 1 to about 30 carbon atoms, R2 comprises a hydrocarbon group having from about 1 to about 30 carbon atoms, and R1 and R2 do not comprise a hydroxyl group.

The features and advantages of the present invention will be readily apparent to those skilled in the art upon a reading of the description of the embodiments that follows.

DESCRIPTION

The present invention relates to methods and compositions for increasing the viscosity of a fluid. More particularly, the present invention relates to divinyl sulfone crosslinking agents, viscosified treatment fluids, and methods of using these compositions in applications wherein viscosified treatment fluids may be used. Examples include, but are not limited to, viscosified treatment fluids used in subterranean applications, such as drilling fluids, fracturing fluids, and gravel packing fluids. Although many of the embodiments of the present invention will be discussed in the context of subterranean applications, such discussion is only intended to illustrate some applications of the vinyl sulfone crosslinking agents of the present invention. The vinyl sulfone crosslinking agents of the present invention are suitable for many uses wherein it is necessary to increase the viscosity of a treatment fluid by crosslinking a gelling agent in the fluid. In many embodiments, the viscosified treatment fluids of this invention are free of metal-based crosslinking agents, which may be advantageous because formation fouling may be avoided, predictable viscosification may be obtained, and the resultant viscosified treatment fluids may have consistent gelling characteristics.

The viscosified treatment fluids of this invention comprise an aqueous base fluid and a crosslinked gelling agent, the crosslinked gelling agent comprises at least one alkyl sulfone bridge formed by a crosslinking reaction comprising a divinyl sulfone crosslinking agent of this invention and a gelling agent.

The base fluid component of the viscosified treatment fluids of this invention should be an aqueous fluid. The base fluid may comprise, for example, fresh water, saltwater (e.g., water containing one or more salts dissolved therein), brine (e.g., saturated salt water), or seawater. The water can be from any source as long as it does not contain an excess of compounds that adversely affect other components in the viscosified treatment fluid. Potentially problematic ions include strongly nucleophilic ions or species, e.g., ammonia, amines, and the like. To achieve the beneficial effects of this invention, the pH of the base fluid should be 7 or higher. In preferred embodiments, the pH should be 8 or higher; in more preferred embodiments, the pH should be 9 or higher, e.g., 9.5. pHs below about 7 do not allow the divinyl sulfone crosslinking agents of the present invention to effectively crosslink the gelling agent molecules. If the pH of the base fluid is not 7 or higher, a pH adjuster can be added to the base fluid. Suitable pH adjusters will be discussed below.

A variety of gelling agents can be used in the viscosified treatment fluids of the present invention. Suitable gelling agents typically comprise biopolymers, synthetic polymers, or both. Suitable gelling agents often are hydratable polymers that have one or more functional groups. These functional groups include, but are not limited to, hydroxyl groups, carboxyl groups, carboxylic acids, derivatives of carboxylic acids, sulfate groups, sulfonate groups, phosphate groups, phosphonate groups, and amino groups. Preferred gelling agents have hydroxyl groups and/or amino groups. In certain exemplary embodiments, the gelling agents may be biopolymers and derivatives thereof that have one or more of these monosaccharide units: galactose, mannose, glucoside, glucose, xylose, arabinose, fructose, glucuronic acid, or pyranosyl sulfate. Examples of suitable biopolymers include, but are not limited to, guar gum and derivatives thereof, such as hydroxypropyl guar and carboxymethylhydroxypropyl guar, and cellulose derivatives, such as hydroxyethylcellulose. Guar is a particularly preferred gelling agent for use in this invention. Additionally, synthetic polymers that contain the above-mentioned functional groups may be used. Examples of such synthetic polymers include, but are not limited to, poly(acrylate), poly(methacrylate), poly(ethylene imine), poly(acrylamide), poly(vinyl alcohol), and poly(vinylpyrrolidone). Other suitable gelling agents include chitosans, starches and gelatins. In certain embodiments, the gelling agent should be included in an amount so as to exceed C* for that gelling agent. C* as used herein refers to the minimum concentration of gelling agent polymer needed for effective crosslinking. The C* concentration may also be described as that concentration necessary to cause polymer chain overlap. Sufficient polymer chain overlap to effectively obtain a crosslinked gel is thought to occur when polymer concentration exceeds the C* concentration. Thus, generally speaking, the higher the polymer concentration, the greater the polymer chain overlap and the greater the potential gel strength after crosslinking. In certain embodiments, the gelling agent is present in the treatment fluids of the present invention in an amount in the range of from about 0.1% to about 50% wt/vol % of the base fluid therein. In certain exemplary embodiments, the gelling agent is present in the treatment fluids of the present invention in an amount in the range of from about 0.1% to about 2% wt/vol % of the base fluid therein. How much of the gelling agent to include in the treatment fluid may depend on the particular gelling agent used and the characteristics desired in the viscosified treatment fluid. Generally speaking, the lower the molecular weight of the gelling agent, the higher the concentration of the gelling agent in the treatment fluid will need to be to achieve a useful viscosified treatment fluid.

The divinyl sulfone crosslinking agents of this invention may be used to crosslink gelling agent molecules to form a crosslinked gelling agent comprising at least one alkyl sulfone bridge. The divinyl sulfone crosslinking agents of this invention can be described by this formula:

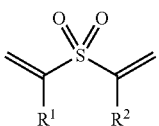

wherein $R^1$ comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, amides, esters, or a mixture thereof. $R^1$ should not comprise a hydroxyl group. $R^2$ also comprises a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, amides, esters, or a mixture thereof. $R^2$ also should not comprise a hydroxyl group. $R^1$ and $R^2$, preferably, should not be too bulky because of potential undesirable steric hindrance problems. The vinyl sulfone crosslinking agents of this invention form alkyl sulfone bridges between molecules of a gelling agent. For instance, when reacting with a guar gelling agent, the following reaction may occur:

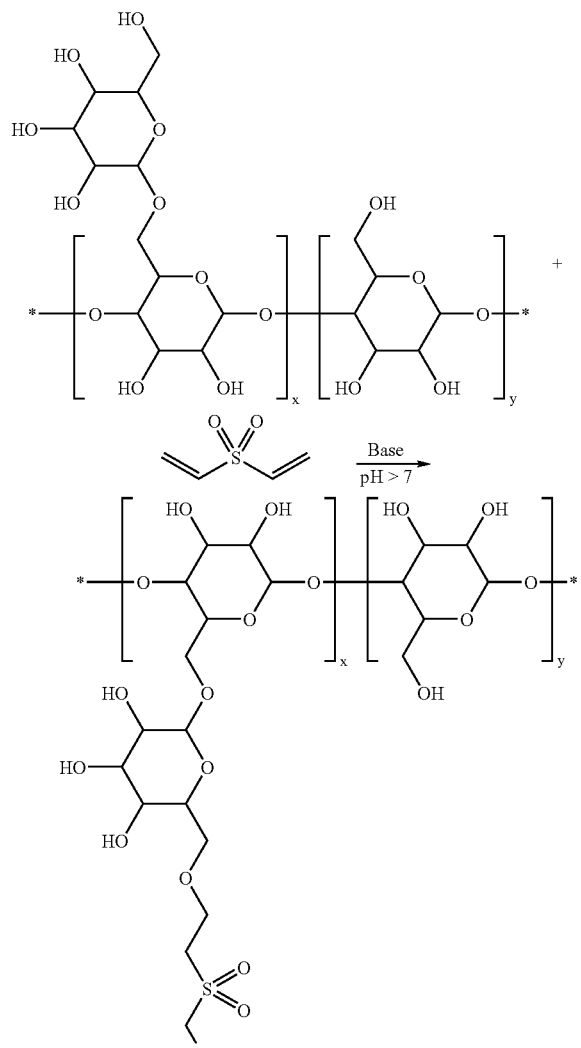

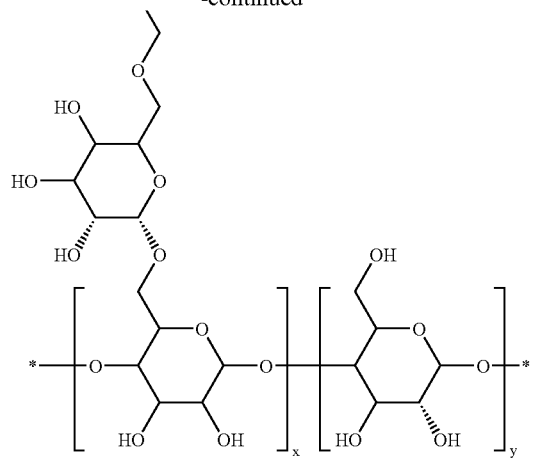

In the reaction described above, note the alkyl sulfone bridge formed between molecules of the gelling agent. Under appropriate conditions (e.g., pH), the divinyl sulfone crosslinking agents of this invention may allow at least one crosslink that comprises an alkyl sulfone bridge to form between at least two gelling agent molecules thereby forming a crosslinked gelling agent that may increase the viscosity of a viscosified treatment fluid.

The divinyl sulfone crosslinking agents of the present invention generally may be present in a treatment fluid of this invention in amounts sufficient to provide the desired degree of crosslinking between gelling agent molecules. In certain exemplary embodiments, the divinyl sulfone crosslinking agents are used in an amount in the range of from about 0.003% to about 1% by weight of the aqueous base fluid therein.

One should note that the crosslinking reaction may be inherently delayed. For instance, a viscosified treatment fluid comprising a crosslinked gelling agent that comprises at least one alkyl sulfone bridge may not form for about 6 to about 24 hours after addition of a suitable divinyl sulfone crosslinking agent at room temperature. Such reactions may proceed at a faster rate at higher temperatures. Also, the crosslinking reaction may be catalyzed by adding a suitable catalyst. Suitable catalysts will be known to those of ordinary skill in the art with the benefit of this disclosure, for example, any soluble metal ion that has a Lewis acid character may act as a suitable catalyst. Examples include lithium or aluminum salts. The inherent delay may be enhanced to provide a longer delay, if desired. For instance, the divinyl sulfone crosslinking agent may be encapsulated to provide a delayed reaction, or the pH of the fluid may be maintained at a level where crosslinking would not occur until a desired time. In embodiments wherein the crosslinking agent is encapsulated, suitable coating or containment means include degradable materials in which the products of the degradation do not adversely affect the divinyl sulfone crosslinking agents of the present invention. The terms "degradation" or "degradable" refer to both the two relatively extreme cases of hydrolytic degradation that the degradable material may undergo, i.e., heterogeneous (or bulk erosion) and homogeneous (or surface erosion), and any stage of degradation in between these two. Examples of degradable materials that may be used as a coating or containment means in conjunction with the divinyl sulfone crosslinking agents of the present invention include, but are not limited to, polysaccharides, such as dextran or cellulose; chitins; chitosans; proteins; aliphatic polyesters; poly(lactides); poly(glycolides); poly(ε-caprolactones); poly(hydroxybutyrates); poly(anhydrides); aliphatic polycarbonates; orthoesters; poly(lactones); poly(orthoesters); poly(amino acids); poly(ethylene oxides); and poly(phosphazenes). Other suitable degradable polymers include heat-sealable materials, other thermoplastic materials, or materials that may be dissolved with an appropriate solvent (e.g., hydroxypropylmethylcellulose, pectin, poly(ethylene oxide), poly(vinyl alcohol), alginate, poly(caprolactone), gelatinized starch-based materials, and the like). Exemplary encapsulation methodologies are described in U.S. Pat. Nos. 5,373,901; 6,444,316; 6,527,051; and 6,554,071, the relevant disclosures of which are incorporated herein by reference. In certain exemplary embodiments, blends of these materials may be used to provide an encapsulating coating for the divinyl sulfone crosslinking agents.

The divinyl sulfone crosslinking agents of the present invention may be provided or used in any suitable form. For instance, the divinyl sulfone crosslinking agents may be a liquid, a gel, an emulsion, or a solid. The form of the divinyl sulfone crosslinking agent may depend on the specific choice of the divinyl sulfone crosslinking agent described by the formula. For example, $R^1$ and/or $R^2$ of the formula may comprise molecules that result in a divinyl sulfone crosslinking agent that is at least partially insoluble in water. Thus, this divinyl sulfone crosslinking agent likely would not be used in an aqueous form. In other embodiments, a divinyl sulfone crosslinking agent may be dissolved, suspended, or emulsified in a liquid. In other embodiments, a divinyl sulfone crosslinking agent may be used in a form that allows for a delayed release of the divinyl sulfone crosslinking agent, as mentioned above. A delayed release may be desirable when a subterranean operation involves high temperature conditions, and release of the divinyl sulfone crosslinking agent is desired after these high temperature conditions occur. Another example is in wells with temperatures that require a second crosslinking agent; the second crosslinking agent may be tailored to become available for crosslinking when a first crosslinker fails. A delayed release also may be desirable in a deep well or in a well requiring a long pump time. A person having ordinary skill in the art, with the benefit of this disclosure, will recognize the appropriate encapsulation or coating technique to use with the divinyl sulfone crosslinking agents of the present invention.

Suitable pH adjusters are those compounds that will adjust and/or maintain the pH of the base fluid with a suitable gelling agent at a desired level without introducing potentially problematic ions. Suitable pH adjusters include, but are not limited to, hydroxides, phosphates, carbonates, bicarbonates, borates, derivatives thereof, and compilations thereof. Preferred pH adjusters include the phosphate, carbonate, and bicarbonate varieties. Certain pH adjusters will have the ability to maintain the pH of a treatment fluid at a desired level, and some will not. For instance, phosphate and borate pH adjusters will be able to maintain the pH of the fluid at a desired level. One should be mindful of this characteristic when choosing a pH adjuster. One should also note that borates may act as buffers but may also crosslink the gelling agent, which may be problematic or desirable, depending on the circumstances. If a chosen borate does not interact with the chosen gelling agent and such interaction is not desirable, then that borate may be a suitable pH adjuster. The pH adjuster should be included in the treatment fluids of the invention in an amount sufficient to adjust and/or maintain the pH at a desired level. In certain embodiments, this amount may range from about 0.05% to about 2% by weight of the treatment fluid.

The viscosified treatment fluids of the present invention optionally may comprise particulates suitable for subterranean applications. Suitable particulates include, but are not limited to, gravel, sand, particulate garnet, glass, ground nut hulls, metal (e.g., aluminum) pellets, bauxite, ceramic particulates, polymeric materials, derivatives thereof, combinations thereof, and the like. In some embodiments, these particulates may be coated with resins, tackifiers, or both, if desired, e.g., to consolidate the particulates downhole. One having ordinary skill in the art, with the benefit of this disclosure, will recognize the particulate type, size, and amount to use in conjunction with the viscosified treatment fluids of the present invention to achieve a desired result. In certain exemplary embodiments, the particulates used may be included in the viscosified treatment fluid to form a gravel pack downhole or as proppant particulates in fracturing operations.

Additional additives may be added to the viscosified treatment fluids of the present invention as deemed appropriate by one skilled in the art with the benefit of this disclosure. Examples of such additives include, but are not limited to, fluid loss control agents, surfactants, weighting agents, scale inhibitors, clay stabilizers, silicate-control agents, antifoaming agents, foaming agents, biocides, biostatic agents, storage stabilizers, and combinations thereof.

In some applications, after a viscosified treatment fluid has performed its desired function, its viscosity may be reduced. For example, in a subterranean application, once the viscosified treatment fluid's viscosity is reduced, it may be flowed back to the surface, and the well may be returned to production. The mechanism of the crosslinking reaction is believed to comprise a "Michael reaction," which is a conjugate addition reaction. Under most conditions, these reactions are reversible, and therefore, these crosslinks may be reversible due to the equilibrium nature of the reaction. Breaking of the fluid can be controlled by temperature and concentration. The reversibility of the crosslinks may make the viscosified treatment fluids more shear-thinning but rehealing, and able to suspend sand in a manner that could suggest a covalent crosslink. Reducing the viscosity of a viscosified treatment fluid may occur by adjusting the pH of the treatment fluid so that crosslinks between gelling agent molecules become unstable or "delink." The terms "delink" or "delinking" refer to the reversible removal of crosslinks between at least two molecules that are crosslinked (e.g., crosslinked gelling agent molecules). Delinking also may occur, independent of pH, through the addition of a compound capable of reversing the crosslink. Although the crosslinked gelling agent molecules crosslinked with the divinyl sulfone crosslinking agents of the present invention may be capable of delinking based on pH, any suitable breaker may be used with the viscosified treatment fluids of the present invention. The term "breaker" refers to an agent that is capable of reducing the viscosity of a treatment fluid. For example, any breaker that is an acid, oxidizer, or enzyme known in the art may be used with the treatment fluids of the present invention. In certain embodiments, if a solid breaker is used, then they should be used in a range of from about 0.25 to 10 lbs./1000 gal. of base fluid. In other embodiments wherein a liquid breaker is used, the liquid breaker should be used in an amount from about 0.25 to 10 gal./1000 gal. of base fluid.

In a preferred embodiment, a divinyl sulfone crosslinking agent is added to a gelling agent in an aqueous base fluid that has a pH of about or above 9. The mixture is then heated at temperatures above room temperature to crosslink the gelling agent, to form a crosslinked gelling agent comprising at least one alkyl sulfone bridge. In this embodiment, the concentration of the divinyl sulfone crosslinking agent should be above about 0.005 vol %. The resulting viscosified treatment fluid should have a viscosity similar to borate crosslinked viscosified treatment fluid at elevated temperatures of from about 60° C. to about 120° C., and is capable of suspending sand for extended periods of time from several days to a week at room temperature.

The viscosified treatment fluids of the present invention can be utilized for carrying out a variety of subterranean well treatments, including, but not limited to, fracturing and gravel packing subterranean formations. In certain embodiments in which the viscosified treatment fluids of the present invention are used in conjunction with fracturing operations, fracturing fluids comprising an aqueous base fluid and a crosslinked gelling agent, the crosslinked gelling agent comprising at least one alkyl sulfone bridge may be placed in a subterranean formation so as to create or enhance one or more fractures therein. After the fracturing fluid has performed its desired function, or after a desired time, the viscosity of the fracturing fluid may be reduced and the fluid recovered.

In certain embodiments in which the viscosified treatment fluids of the present invention are used in conjunction with gravel packing operations, gravel packing fluids comprising an aqueous base fluid, gravel, and a crosslinked gelling agent, the crosslinked gelling agent comprising at least one alkyl sulfone bridge, may be placed in or near a portion of a subterranean formation so as to create a gravel pack. After the gravel pack is substantially in place, the viscosity of the gravel packing fluid may be reduced to a desired degree.

To facilitate a better understanding of the present invention, the following examples of specific embodiments are given. In no way should the following examples be read to limit or define the entire scope of the invention.

EXAMPLES

Description of Materials Used for These Examples: The divinyl sulfone crosslinking agent of 99% purity was obtained in liquid form from Aldrich Chemical Company and used as received. The gelling agent, guar flour (PolyPro 420™), was obtained from PolyPro, Inc. in Dalton, Ga. The gelling agents hydroxyethylcellulose (HEC) and xanthan were used as solid materials and are products of Halliburton Energy Services in Duncan, Okla.; they were used without further purification or modification. The gelling agent corn starch was a food grade corn starch obtained from the ACH Food Companies as a solid. The gelling agent gelatin (300 bloom strength) was obtained as a solid material from the Aldrich Chemical Company. The gelling agent poly(vinyl alcohol) (molecular weight of 115 kdalton) was 100% hydrolyzed and was obtained as a solid from Aldrich Chemical Company. The gelling agent poly(ethylene imine) was supplied by Halliburton Energy Services, Duncan, Okla., as a 25% solution in water. The sodium thiosulfate stabilizer was obtained from Halliburton Energy Services. The stabilizer phenol was obtained as a solid of 99% purity from Aldrich Chemical Company. The acetate-based pH adjuster and the carbonate-based pH adjuster were obtained from Halliburton Energy Services. The pH adjuster sodium hydroxide was obtained as a pure solid from Aldrich Chemical Company.

Guar Example: Guar mixtures were prepared as 40 lb/1000 gal solutions using deionized water. The guar gelling agent was allowed to hydrate for at least 1 hour prior to the addition of a buffer or salts. After pH adjustment to 9 to 9.5 with a suitable pH adjuster (e.g., the carbonate-based pH adjuster), the guar mixture was stirred for an additional 10 minutes prior to adding the divinyl sulfone crosslinking agent at two gallons per thousand gallons of base fluid. Once the divinyl sulfone crosslinking agent was added, the mixture was then heated in a water bath at 60° C. for 30 minutes to give a viscosified treatment fluid.

Hydroxyethylcellulose Example: Hydroxyethylcellulose (HEC) was hydrated for 1 h our in deionized water as a 80 lb/1000 gal mixture and treated in the same manner as the above guar example to give a viscosified treatment fluid after 30 minutes.

Starch Example: Starch was hydrated as 5% mixtures in deionized water and then to 80° C. for 20 minutes to fully dissolve the starch. The mixture was then cooled to 60° C. prior to treatment with the carbonated-based pH adjuster and the divinylsulfone crosslinking agent as above for the guar example to give a stable viscosified treatment fluid.

Gelatin Example: Gelatin was dissolved in deionized water as a 5% mixture at 60° C. prior to treatment with a pH adjuster and the divinylsulfone crosslinking agent as above for the guar example to give a stable viscosified treatment fluid that did not break upon subsequent heating to 90° C.

Poly(vinyl alcohol) Example: Poly(vinyl alcohol) was dissolved in deionized water at 60° C. for several days to a 2% solution prior to treatment with the carbonate-based pH adjuster, and then the divinylsulfone crosslinking agent was added as above for the guar example to give a stable viscosified treatment fluid.

Poly(ethylene imine): Poly(ethylene imine) was prepared as a 5% solution in deionized water prior to treatment with a pH adjuster and a divinylsulfone crosslinking agent as above for the guar example. An insoluble precipitate formed very quickly upon addition of the divinylsulfone crosslinking agent. This may be indicative of a more highly crosslinked system as opposed to a more lightly crosslinked system, such as that of a viscosified treatment fluid.

Additional viscosified treatment fluids were then submitted to rheological testing. The treatments fluids were prepared as 40 lb/1000 gal guar solutions using deionized water. The guar gelling agent was allowed to hydrate for at least 1 hour prior to the addition of buffer or salts. After pH adjustment to 9 to 9.5 with a suitable pH adjuster (e.g., with a carbonate based pH adjuster), the guar mixtures were stirred for an additional 10 minutes prior to the adding of divinyl sulfone crosslinking agent at 2 gal/1000 gal of base fluid. Each sample was heated to 60° C. for a desired amount of time; the samples were then cooled to room temperature prior to determination of storage modulus (G') and loss modulus (G"). Oscillatory measurements to determine G' and G" were performed using a Haake RS-150 rheometer using a 60 mm/2° cone with a 0.106 mm gap. Oscillatory measurements were performed from 0.1 to 100 Pa, and frequency sweeps were performed from 10 to 0.1 Hz, at a stress of 1 Pa, provided that the stress was in the linear region at 1 Pa, otherwise the stress was set to 0.5 Pa.

Rheology and Viscosity Data for a Guar Sample

Table 1 contains the G', G" data obtained from a 40 lb/1000 gal guar gel, prepared as described above, and heated at 60° C. for 2, 4 and 6 hours.

TABLE 1

| Time | G' (plateau) | G' (10 Pa) | G' (100 Pa) | G" (plateau) | G" (10 Pa) | G" (100 Pa) |
|---|---|---|---|---|---|---|
| 2 h | 10.2 Pa | 6.3 Pa | 3.5 Pa | 2.3 Pa | 2.3 Pa | 3.1 Pa |
| 4 h | 9.0 Pa | 4.6 Pa | 4.7 Pa | 2.0 Pa | 2.1 Pa | 3.2 Pa |
| 6 h | 10.1 Pa | 6.3 Pa | 4.7 Pa | 2.3 Pa | 2.2 Pa | 3.2 Pa |

High temperature viscosity data was obtained using a Brookfield PVS viscometer equipped with a B02 bob and an applied shear rate of 40 s$^{-1}$. Data was acquired by keeping the heating bath at a constant 100° C. for a period of at least 2.5 hours. Table 2 contains a summary of the maximum viscosity times with various additives, the time to 500 cP at 100° C. of guar gels at 40 lbs guar/1000 gallons concentration and the pH adjusted to approximately 9.5 with BA-40L made according to the procedure above.

TABLE 2

| Additive | Divinyl Sulfone Crosslinking Agent | $\eta_{max}$ | $t_{max}$ | $t_{500cP}$ |
|---|---|---|---|---|
| none | 0.2 vol % | 1580 cP | 34.5 min | 82 min |
| Sodium Thiosulfate Stabilizer | | | | |
| 0.25 vol % | 0.2 vol % | 1829 cP | 37 min | 101.5 min |
| 0.50 vol % | 0.2 vol % | 2090 cP | 27.5 min | 80.5 min |
| 1.0 vol % | 0.2 vol % | 1543 cP | 27.5 min | 89.5 min |
| Phenol | | | | |
| 0.05 wt % KCl | 0.2 vol % | 1254 cP | 35.5 min | 84 min |
| 7 wt % | 0.2 vol % | 1635 cP | 30 min | 90 min |

Thus, it has been demonstrated that divinyl sulfone crosslinking agents under alkaline conditions can effectively crosslink polysaccharide gelling agents to form viscosified treatment fluids comprising a crosslinked gelling agent having at least one alkyl sulfone bridge.

Therefore, the present invention is well-adapted to attain the ends and advantages mentioned as well as those that are inherent therein. While numerous changes may be made by those skilled in the art, such changes are encompassed within the spirit of this invention as defined by the appended claims.

What is claimed is:

1. A method of treating a portion of a subterranean formation comprising:
providing a viscosified treatment fluid that comprises an aqueous base fluid and a crosslinked gelling agent, wherein the crosslinked gelling agent comprises at least one alkyl sulfone bridge, and a gelling agent selected from the group consisting of guar, cellulose, starch, gelatin, derivatives thereof, and combinations thereof; treating the portion of the subterranean formation.

2. The method of claim 1 wherein treating the portion of the subterranean formation involves a drilling operation, a fracturing operation, or a gravel packing operation.

3. The method of claim 1 wherein the aqueous base fluid comprises at least one of the following: fresh water, saltwater, brine, or seawater.

4. The method of claim 1 wherein the aqueous base fluid has a pH of at least about 7.

5. The method of claim 1 wherein the viscosified treatment fluid comprises particulates.

6. The method of claim 5 wherein the particulates comprise at least one of the following: gravel, natural sand, quartz sand, particulate garnet, glass, nut hulls, nylon pellets, aluminum pellets, bauxite, ceramic particulate, a polymeric particulate, or a combination thereof.

7. The method of claim 1 wherein the viscosified treatment fluid comprises at least one of the following: a fluid loss control agent, a surfactant, a weighting agent, a scale inhibitor, a clay stabilizer, a silicate-control agent, an antifoaming agent, a foaming agent, a biocide, a biostatic agent, a storage stabilizer, or a combination thereof.

8. The method of claim 1 wherein the viscosified treatment fluid comprises a breaker.

9. The method of claim 8 wherein the breaker comprise at least one of the following: an acid, an oxidizer, an enzyme, or a combination thereof.

10. The method of claim 8 wherein the breaker is a solid, and is included in an amount in the range of from about 0.25 to 10 lbs. per thousand gal. of the base fluid.

11. The method of claim 8 wherein the breaker is a liquid, and is included in an amount in the range of from about 0.25 to 10 gal. per thousand gal. of the base fluid.

12. The method of claim 1 further comprising the step of reducing the viscosity of the viscosified treatment fluid after the step of treating the portion of the subterranean formation.

13. A method of treating a portion of a subterranean formation comprising:
providing a viscosified treatment fluid that comprises an aqueous base fluid and a crosslinked gelling agent, the crosslinked gelling agent being formed by a crosslinking reaction comprising a gelling agent selected from the group consisting of guar, cellulose, starch, gelatin, derivatives thereof, and combinations thereof; and a divinyl sulfone crosslinking agent described by this formula:

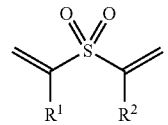

wherein R$^1$ comprises a hydrocarbon group having from about 1 to about 30 carbon atoms, R$^2$ comprises a hydrocarbon group having from about 1 to about 30 carbon atoms, and R$^1$ and R$^2$ do not comprise a hydroxyl group; and
treating the portion of the subterranean formation.

14. The method of claim 13 wherein treating the portion of the subterranean formation involves a drilling operation, a fracturing operation, or a gravel packing operation.

15. The method of claim 13 wherein the gelling agent is present in an amount so as to exceed C* for the gelling agent.

16. The method of claim 13 wherein the gelling agent is present in an amount of from about 0.1% to about 50% wt/vol% of the base fluid.

17. The method of claim 13 wherein the gelling agent is present in an amount of from about 0.1% to about 2% wt/vol% of the base fluid.

18. The method of claim 13 wherein the divinyl sulfone crosslinking agent is present in an amount of from about 0.003% to about 1% by weight of the aqueous base fluid.

19. The method of claim 13 wherein the crosslinking reaction includes a catalyst.

20. The method of claim 19 wherein the catalyst comprises a metal ion that has a lewis acid character.

21. The method of claim 19 wherein the catalyst comprises at least one of the following: a lithium salt, an aluminum salt, a derivative thereof, or a mixture thereof.

22. The method of claim 13 wherein the crosslinking reaction is delayed for a chosen period of time.

23. The method of claim 22 wherein the divinyl sulfone crosslinking agent is encapsulated by an encapsulating coating.

24. The method of claim 23 wherein the encapsulating coating comprises a degradable material.

25. The method of claim 13 wherein the divinyl sulfone crosslinking agent is a liquid, a gel, an emulsion, or a solid.

26. The method of claim 13 wherein the viscosified treatment fluid comprises a pH adjuster.

27. The method of claim 26 wherein the pH adjuster comprises at least one of the following: a hydroxide, a phosphate, a carbonate, a bicarbonate, a borate, a derivative thereof, or a mixture thereof.

28. The method of claim 26 wherein the pH adjuster is present in an amount in the range of from about 0.05% to about 2% by weight of the base fluid.

29. A method comprising:
providing a treatment fluid that comprises:
an aqueous base fluid;
a gelling agent selected from the group consisting of guar, cellulose, starch, gelatin, derivatives thereof, and combinations thereof; and
a crosslinking agent, the crosslinking agent comprising a component that can be described by this formula:

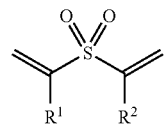

wherein $R^1$ comprises a hydrocarbon group having from about 1 to about 30 carbon atoms, $R^2$ comprises a hydrocarbon group having from about 1 to about 30 carbon atoms, and $R^1$ and $R^2$ do not comprise a hydroxyl group; and
using the treatment fluid in connection with a subterranean operation.

30. The method of claim 29 wherein the treatment fluid comprises a pH adjuster.

31. The method of claim 29 wherein the aqueous base fluid comprises at least one of the following: fresh water, saltwater, brine, or seawater.

* * * * *